US011965146B2

(12) United States Patent
Atokawa

(10) Patent No.: US 11,965,146 B2
(45) Date of Patent: Apr. 23, 2024

(54) BLEACHING APPARATUS AND BLEACHING METHOD OF CLOTHES

(71) Applicant: KUWAHARA CO., LTD., Ichinomiya (JP)

(72) Inventor: Yoshihide Atokawa, Ichinomiya (JP)

(73) Assignee: KUWAHARA CO., LTD, Aichi (JP)

(*) Notice: Subject to any disclaimer, the term of this patent is extended or adjusted under 35 U.S.C. 154(b) by 853 days.

(21) Appl. No.: 17/044,912

(22) PCT Filed: Apr. 1, 2019

(86) PCT No.: PCT/JP2019/014455
§ 371 (c)(1),
(2) Date: Oct. 2, 2020

(87) PCT Pub. No.: WO2019/194120
PCT Pub. Date: Oct. 10, 2019

(65) Prior Publication Data

US 2021/0156063 A1 May 27, 2021

(30) Foreign Application Priority Data

Apr. 2, 2018 (JP) ................................ 2018-070690

(51) Int. Cl.

| | |
|---|---|
| ***C11D 11/00*** | (2006.01) |
| ***C11D 3/395*** | (2006.01) |
| ***D06B 3/30*** | (2006.01) |
| ***D06F 35/00*** | (2006.01) |
| ***D06F 39/00*** | (2020.01) |
| ***D06L 4/10*** | (2017.01) |
| ***D06L 4/30*** | (2017.01) |

(Continued)

(52) U.S. Cl.
CPC .......... *C11D 11/007* (2013.01); *C11D 3/3953* (2013.01); *C11D 3/3956* (2013.01); *D06B 3/30* (2013.01); *D06F 35/00* (2013.01); *D06L 4/10* (2017.01); *D06L 4/30* (2017.01); *D06L 4/50* (2017.01); *D06L 4/657* (2017.01); *D06F 39/00* (2013.01)

(58) Field of Classification Search
None
See application file for complete search history.

(56) References Cited

U.S. PATENT DOCUMENTS 3,916,652 A * 11/1975 Speakman ............. D06F 35/00 68/16
2015/0211165 A1* 7/2015 Willey .................... D06F 35/00 8/137

FOREIGN PATENT DOCUMENTS

| | | | |
|---|---|---|---|
| CN | 1673443 | A | 9/2005 |
| JP | 48-009100 | A | 2/1973 |
| JP | 51-004205 | A | 1/1976 |

(Continued)

OTHER PUBLICATIONS

English machine translation of Santo et al. (JP H1143862 A) accessed from PE2E Search. (Year: 1999).*

*Primary Examiner* — Katie L. Hammer
(74) *Attorney, Agent, or Firm* — Christensen, Fonder & Dardi Herbert PLLC

(57) ABSTRACT

A bleaching apparatus has an immersing vessel for immersing clothes in a chemical liquid, and a light source for irradiating the clothes immersed in the immersing vessel with light. The chemical liquid may include an oxidizing agent or a reducing agent in a concentration of 3 to 30% owf. The illumination intensity of the light is 10,000 to 70,000 lx.

18 Claims, 11 Drawing Sheets

(51) Int. Cl.
*D06L 4/50* (2017.01)
*D06L 4/657* (2017.01)

(56) References Cited

FOREIGN PATENT DOCUMENTS

| | | | | |
|---|---|---|---|---|
| JP | H1143862 | A | * | 2/1999 |
| JP | 2017-506705 | A | | 3/2017 |

* cited by examiner

BLEACHING APPARATUS AND BLEACHING METHOD OF CLOTHES

CROSS-REFERENCE TO RELATED APPLICATIONS

The present application is a U.S. National Phase entry of, and claims priority to, PCT Application No. PCT/JP2019/014455, filed Apr. 1, 2019, which claims priority to Japanese Patent Application No. 2018-070690, filed Apr. 2, 2018, both of which are incorporated herein by reference in their entireties for all purposes.

BACKGROUND

The present disclosure relates to a bleaching apparatus and a bleaching method for clothes.

In many cases, sebum stains, such as keratin or fat, adhered to clothes could not be sufficiently removed through a normal washing procedure using detergent. This may cause yellowing of clothes, due to the accumulation of the remaining sebum stains, such as dead skin or fat, on the clothes over the years. Therefore, clothes have been bleached using various bleaching agent compositions. For example, Japanese Unexamined Patent Application Publication No. 2003-147394 discloses a bleaching agent composition for clothes containing hydrogen peroxide, an interfacial active agent, and water. The pH of the bleaching agent composition is adjusted in the range of 9 to 12. This bleaching agent composition can be used to wash normal sebum stains adhered to clothes just after wearing. The bleaching agent composition is shown to exhibit a high stain removal effect when the bleaching agent composition is applied directly to clothes.

SUMMARY

However, it is difficult to completely remove sebum stains, such as dead skin or fat, even if the above mentioned bleaching agent compositions were to be used. As a result, it is difficult to completely prevent yellowing of such clothes. Further, stronger bleaching agents (ex. a chlorine bleaching agent) may be used to remove such sebum stains as much as possible. However, such strong bleaching agent may cause color loss of clothes. Furthermore, sebum stains may still accumulated in clothes after wearing and washing, even if such a strong bleaching agent is used to wash clothes. Once the remaining stains have cause yellowing, such stains firmly adhere to the fibers of the clothes. Therefore, the yellowed stains are difficult to remove.

Accordingly, an improved bleaching apparatus for clothes and an improved method of bleaching clothes are needed. The present disclosure provides a bleaching apparatus and a bleaching method for clothes to inhibit yellowing of clothes by removing enough of the sebum stains without using a strong bleaching agent.

A bleaching apparatus for clothes of the present disclosure may have an immersing vessel and a light source. The immersing vessel may be used for immersing clothes in a chemical liquid. The immersed clothes in the immersing vessel may be irradiated with light from the light source.

The above-mentioned bleaching apparatus may be used to sufficiently remove stains, not only due to immersing the clothes in the chemical liquid but also irradiating the clothes with the light. In this way, the bleaching apparatus can inhibit the clothes from yellowing.

The clothes bleached in this apparatus may be made of at least one of synthetic fiber, cellulose fiber, and/or animal fiber. It is noted that the washing effect can be remarkable for a cottony material or a polyester material.

Further, the chemical liquid in the immersing vessel may include an oxidizing agent or a reducing agent in a concentration of 3 to 30% owf. When the concentration of the oxidizing agent or the reducing agent is in this range, the washing effect can be increased, while the colors of the clothes can be protected.

Furthermore, the irradiation intensity of the light from the light source may be 10,000 to 70,000 lm. When the irradiation intensity is in this range, the washing effect can be more remarkable, and its energy efficiency can be increased.

The illumination intensity of the light may be 1,000 to 10,000 lx. When the illumination intensity is in this range, the washing effect may be remarkable, and the energy efficiency can be increased.

Further, the irradiation wavelength of the light may be 400 to 650 nm. When the irradiation wavelength of the light is in this range, reaction between the chemical liquid and sebum stains may be activated. As a result, the washing effect can be increased.

The light source may be placed at a position located 5 to 50 cm away from an upper surface of the chemical liquid. This allows the light from the light source to reach the entirety of the clothes and thus, the washing effect can be increased.

A bleaching method of clothes may include an immersing step for immersing clothes in a chemical liquid and a irradiating step for irradiating the clothes with the light from a light source. This method can be used to bleach clothes.

In this method, clothes may be immersed in the chemical liquid and, at the same time, irradiated with the light, thereby sufficiently washing the clothes. This may inhibit yellowing of the clothes.

The clothes bleached in this method may consist of a cottony material or a polyester material. It is noted that the washing effect can be more remarkable for a cottony material or a polyester material.

In the immersing step, the concentration of the oxidizing agent or the reducing agent of the chemical liquid may be 3 to 30% owf. When the concentration of the oxidizing agent or the reducing agent is in this range, the washing effect can be increased, while the colors of the clothes can be protected.

In the irradiating step, the irradiation intensity of the light may be 10,000 to 70,000 lm. When the irradiation intensity is in this range, the washing effect may be more remarkable, and the energy efficiency can be increased.

In the irradiating step, the illumination intensity may be 1,000 to 10,000 lx. When the illumination intensity is in this range, the washing effect can be remarkable, and the energy efficiency can be increased.

In the irradiating step, the irradiation wavelength of the light may be 400 to 650 nm. When the irradiation wavelength is 400 to 650 nm, the chemical liquid can be activated, and thus the washing effect can be increased.

In the immersing step, an immersing temperature may be 10 to 80° C. When the immersing temperature is in this range, the washing effect can be increased.

In the immersing step, an agitation rate may be 5 to 40 r/min. When the agitation rate is in this range, the washing effect can be increased.

In the irradiating step, the irradiation wavelength of the light may be 400 to 650 nm. When the irradiation wavelength is 400 to 650 nm, the chemical liquid can be activated, and thus the washing effect can be increased.

The immersing step and the irradiating step may be performed at the same. By performing the both steps at the same time, the chemical liquid can be more easily activated, and thus the washing effect can be increased.

DETAILED DESCRIPTION

[Bleaching Apparatus for Clothes]

Figure 1:
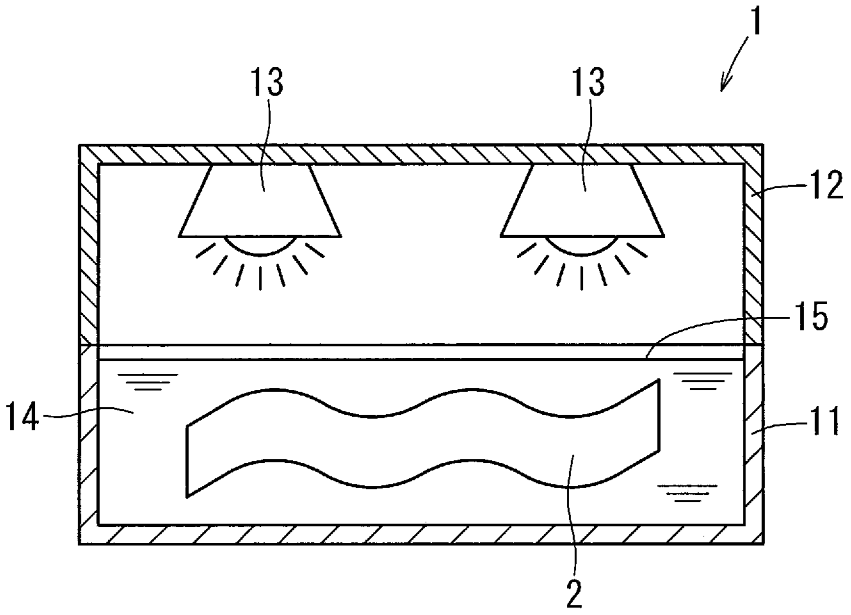
FIG. 1 is a cross-sectional view of a bleaching apparatus.
Figure 2:
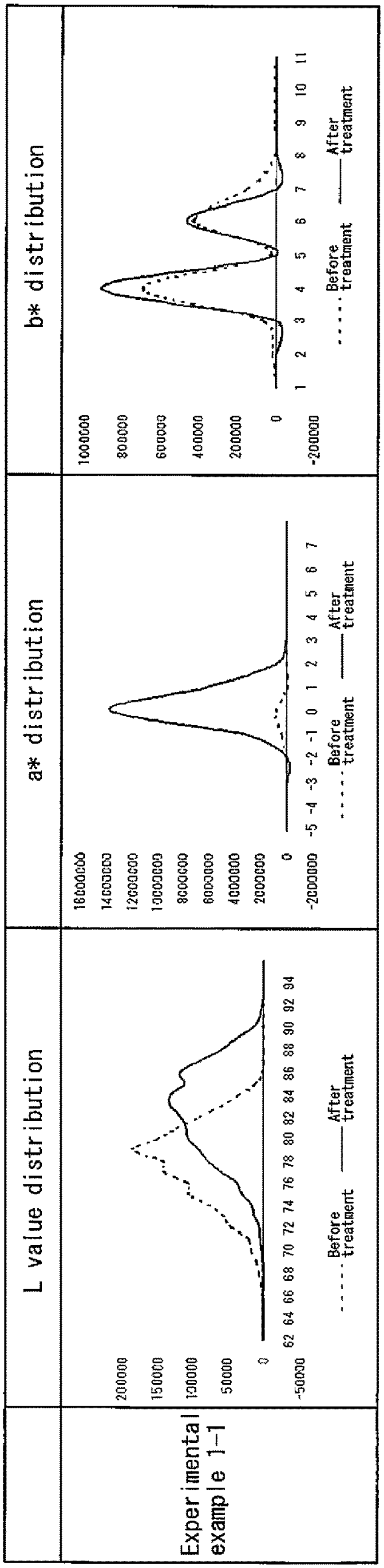
FIG. 2 depicts a graph showing an L* value, a* value, and b* value before and after bleaching in an experimental example 1-1.
Figure 3:
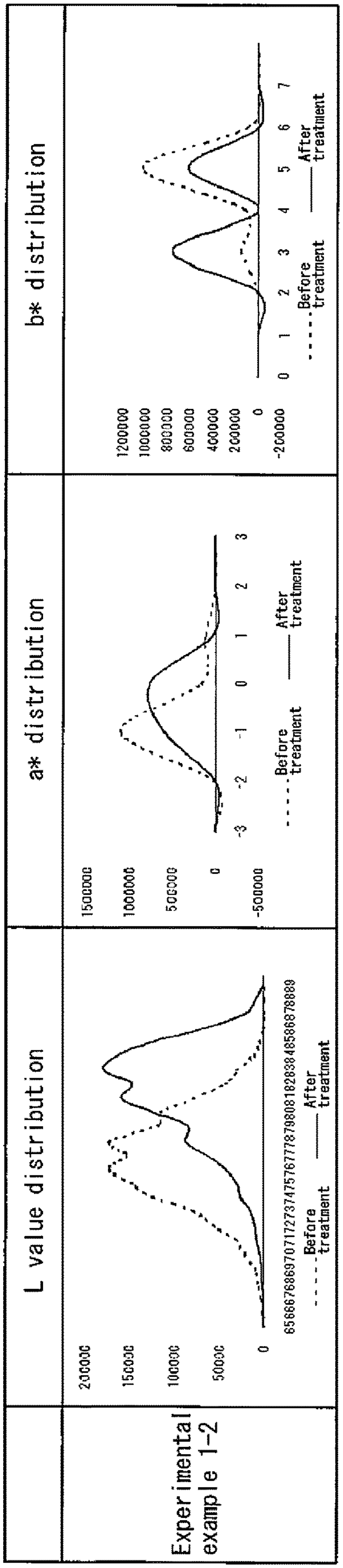
FIG. 3 depicts a graph showing an L* value, a* value, and b* value before and after bleaching in an experimental example 1-2.
Figure 4:
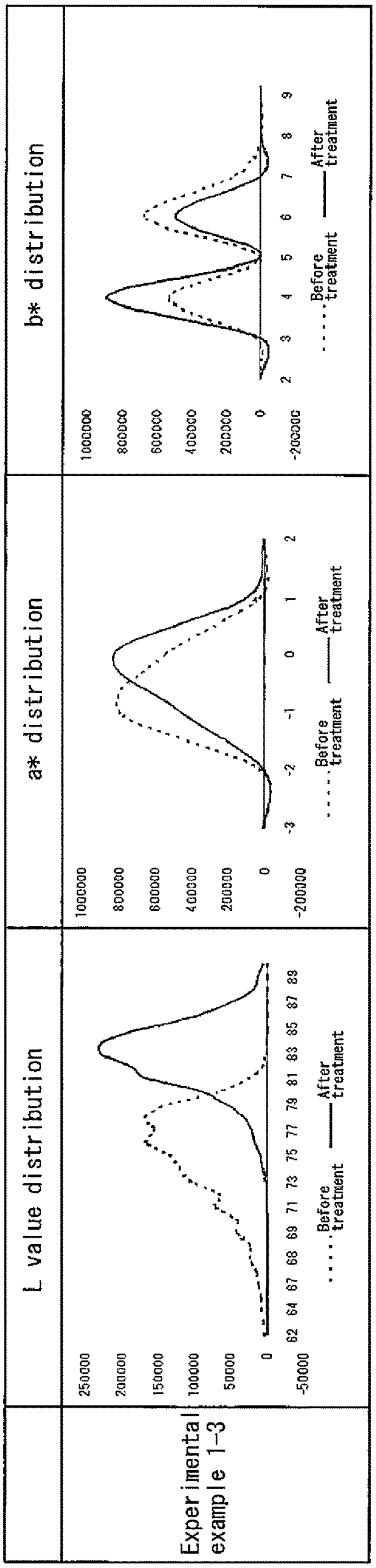
FIG. 4 depicts a graph showing an L* value, a* value, and b* value before and after bleaching in an experimental example 1-3.
Figure 5:
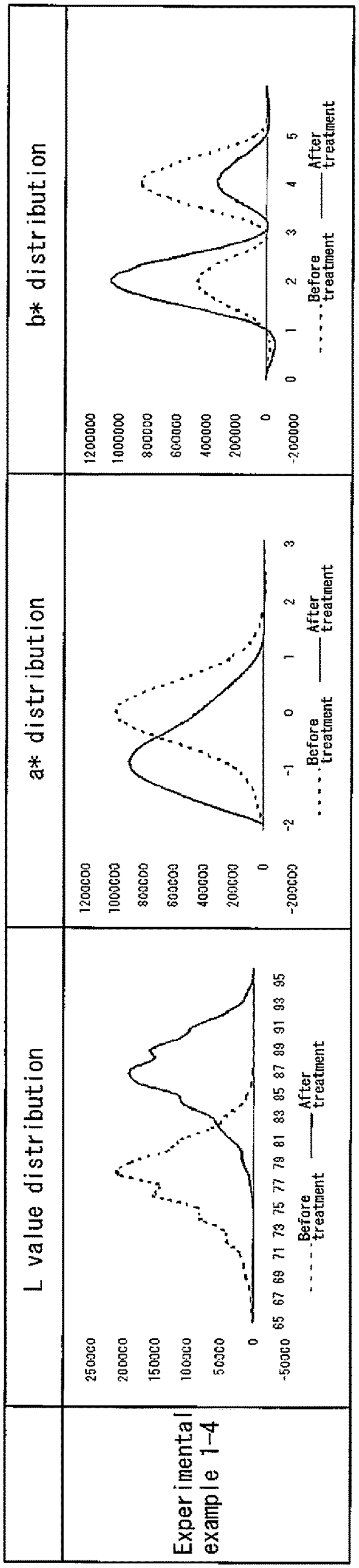
FIG. 5 depicts a graph showing an L* value, a* value, and b* value before and after bleaching in an experimental example 1-4.
Figure 6:
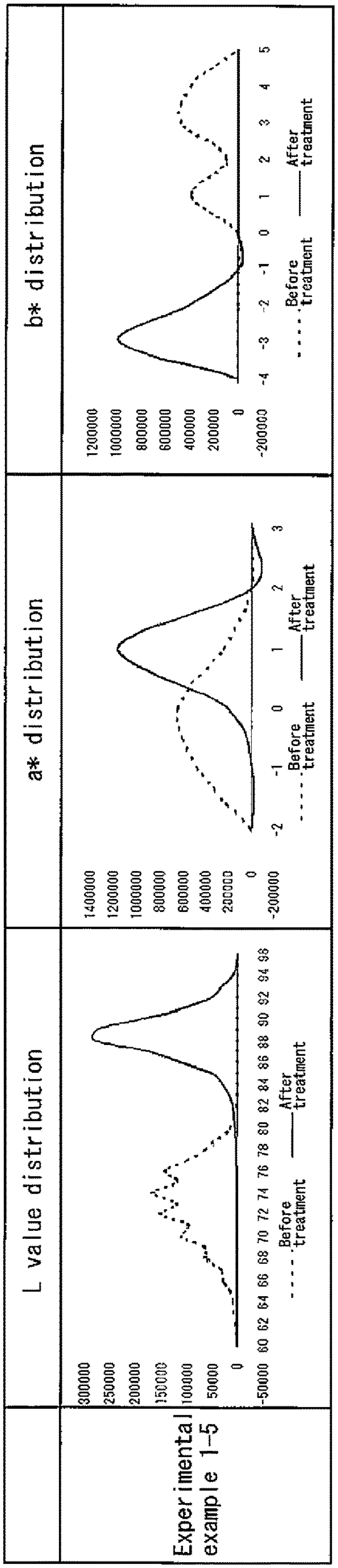
FIG. 6 depicts a graph showing an L* value, a* value, and b* value before and after bleaching in an experimental example 1-5.
Figure 7:
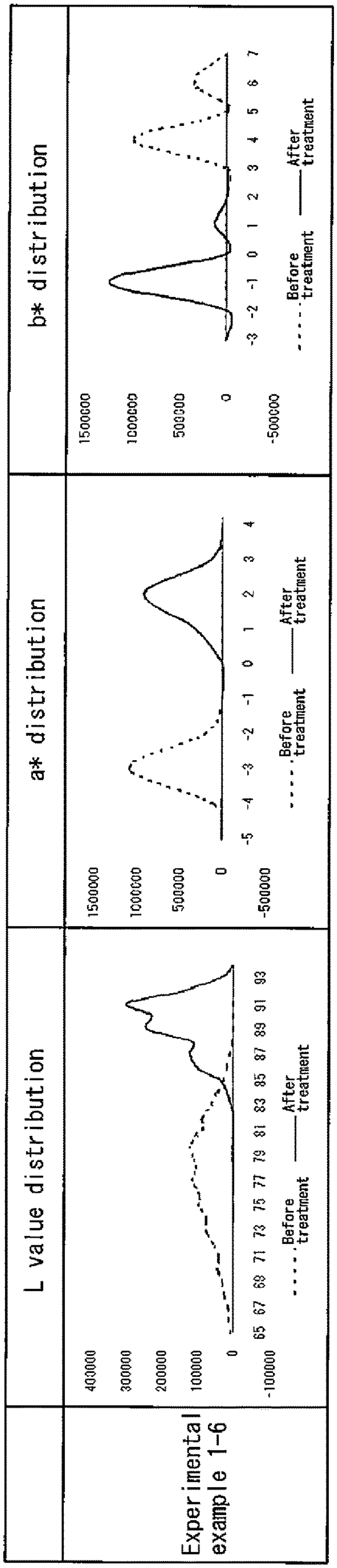
FIG. 7 depicts a graph showing an L* value, a* value, and b* value before and after bleaching in an experimental example 1-6.
Figure 8:
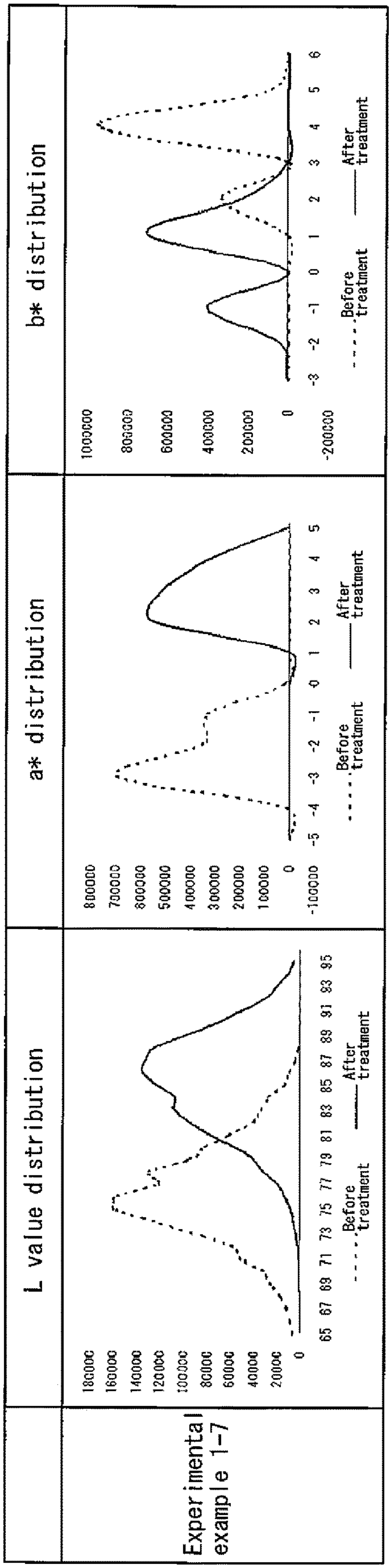
FIG. 8 depicts a graph showing an L* value, a*value, and b* value before and after bleaching in an experimental example 1-7.
Figure 9:
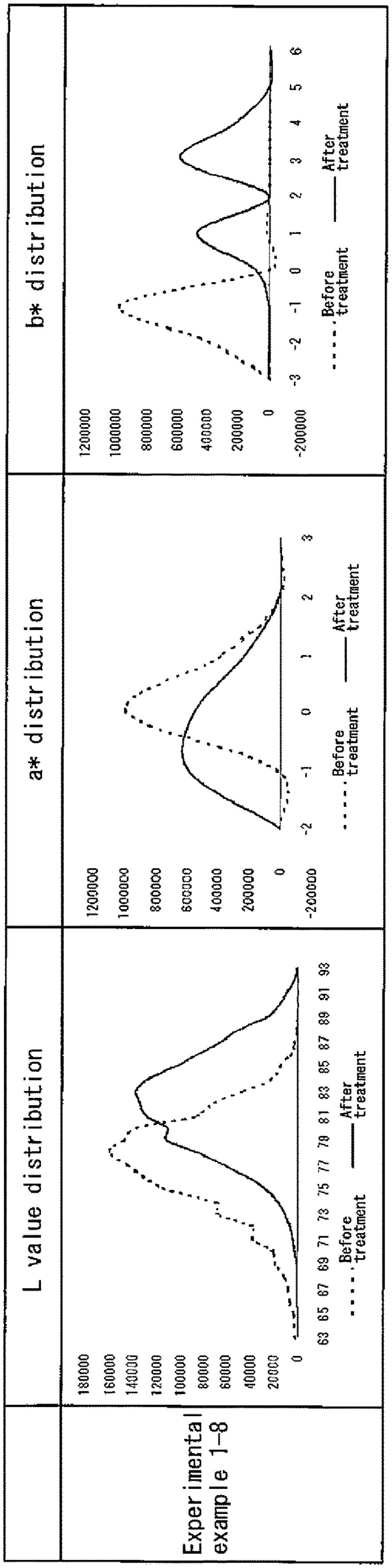
FIG. 9 depicts a graph showing an L* value, a* value, and b* value before and after bleaching in an experimental example 1-8.
Figure 10:
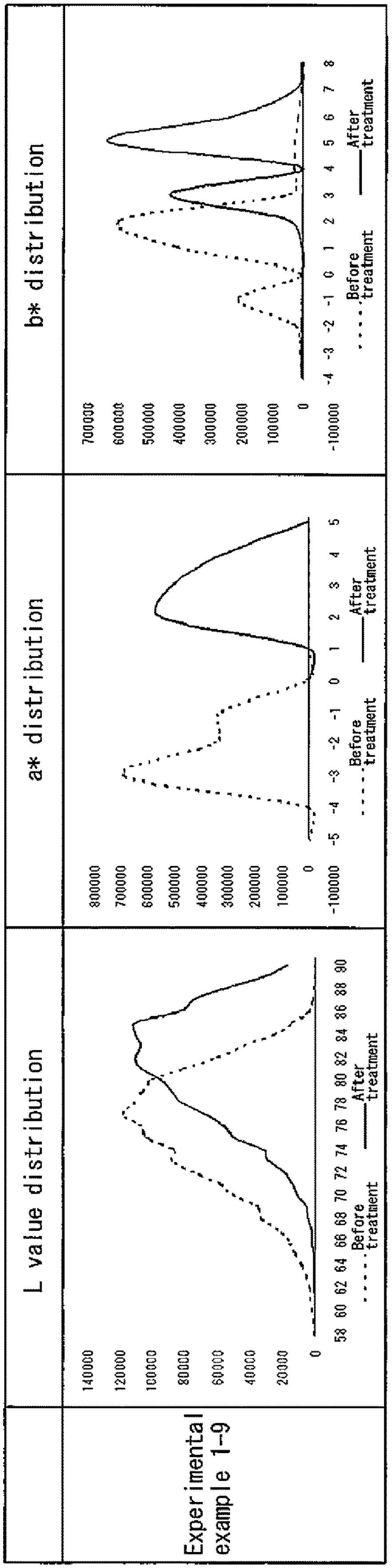
FIG. 10 depicts a graph showing an L* value, a* value, and b* value before and after bleaching in an experimental example 1-9.
Figure 11:
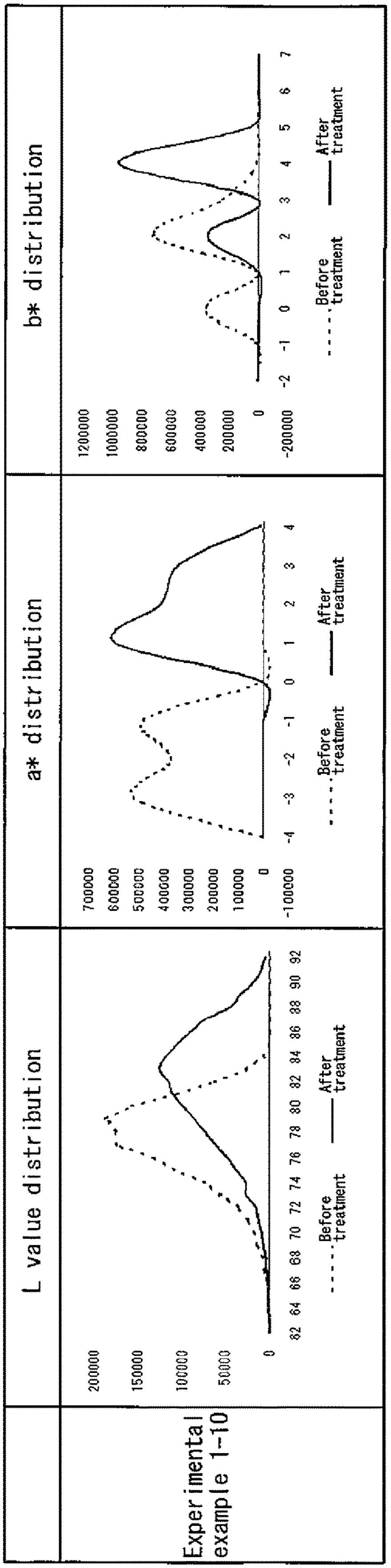
FIG. 11 depicts a graph showing an L* value, a* value, and b* value before and after bleaching in an experimental example 1-10.

A bleaching apparatus according to an embodiment will be described below with reference to FIG. 1. As illustrated in FIG. 1, the bleaching apparatus may include an immersing vessel 11, a lid member 12, a light source 13, and a chemical liquid 14. The immersing vessel 11 may have a cylindrical shape with a bottom. The immersing vessel 11 may hold the chemical liquid 14, described later. The immersing vessel 11 may be used to immerse clothes 2 to be bleached in the chemical liquid 14.

The lid member 12 has a cylindrical shape and has a ceiling portion. The lid member 12 has substantially the same shape as the immersing vessel 11, in a plan view. It is noted that the shape of the lid member 12 is not limited to this shape. The lid member 12 may have any shape capable of covering an upper portion of the immersing vessel 11.

The light sources 13 may be attached to the ceiling portion of the lid member 12. The light sources 13 may be attached so as to irradiate the liquid surface of the chemical liquid 14 with light. Various light sources may be adopted as the light sources 13. Especially, LEDs having a strong peak at a certain wavelength may be preferred as the light sources 13. The light sources 13 may have various shapes. However, for example, water vapor and/or hot water, in addition to the light sources, may become heat sources. Therefore, it is preferable that the shapes of the light sources have no effect on the heat sources. One or more light sources may be used.

The light sources 13 may be provided, for example, above the liquid surface, below the liquid surface, at side surfaces of the bleaching apparatus, or in the water. Preferably, mirror surfaces may be provided in the apparatus so that the light may reach the entirety of the objects. As illustrated in FIG. 1, when the light sources 13 are provided above the liquid surface, the distance between the light sources 13 and the liquid surface may preferably be 5 to 50 cm, inclusive. When the light sources 13 are located apart from the liquid surface by a distance of less than 5 cm, the light may not reach the entirety of the clothes. Additionally, when the light sources 13 are located apart from the liquid surface by a distance of more than 50 cm, the light may not sufficiently reach the clothes.

The irradiation intensity of the light from the light sources 13 may preferably be 10,000 to 70,000 lm. When the irradiation intensity is less than 10,000 lm, sebum stains, which lead to yellowing of clothes, may not be sufficiently removed. On the other hand, when the irradiation intensity is more than 70,000 lm, the level of stain removability may stay unchanged and thus, energy efficiency may be reduced.

The illumination intensity of the light sources 13 may preferably be 1,000 to 10,000 lx, more preferably 1,800 to 9,500 lx. When the illumination intensity is less than 1,000 lx, the sebum stains may not be sufficiently removed. On the other hand, when the illumination intensity is more than 10,000 lx, the level of stain removability may stay unchanged and thus, energy efficiency may be reduced.

The wavelength of the light from the light sources 13 may be preferably 400 to 650 nm, more preferably 400 to 550 nm, still more preferably 420 to 450 nm. When the wavelength is less than 400 nm or more than 650 nm, a sufficient washing effect may not be obtained.

The chemical liquid 14 may be held in the immersing vessel 11. The clothes 2 can be bleached while being immersed in the chemical liquid 14. A temperature of the chemical liquid 14 may preferably be 10 to 80° C., more preferably 40 to 70° C., still more preferably 50 to 60° C. When the temperature is under 10° C., a sufficient washing effect may not be obtained. On the other hand, when the temperature is over 80° C., a stain removal effect may stay unchanged compared to when the temperature is equal to or less than 80° C. Thus, energy efficiency may be reduced.

The clothes 2 may simply be immersed in the immersing vessel 11. Preferably, the chemical liquid 14 may be agitated so that the chemical liquid 14 seeps more evenly into the clothes 2. The agitation rate may preferably be 5 to 40 r/min, more preferably 10 to 30 r/min, still more preferably 15 to 20 r/min. When the agitation rate is less than 5 r/min, the agitation may be not enough. Thus, the sebum stains on the clothes may not be removed enough. On the other hand, an agitation rate of more than 40 r/min is unnecessary. Thus, the energy used for agitation may actually be wasted.

Detergents or bleaching agents dissolved in the chemical liquid 14 may be not particularly limited. Commonly used detergents may be included in the chemical liquid 14. The detergents or bleaching agents may include, for example, an oxidizing agent or a reducing agent. However, an oxidizing agent is more preferable than a reducing agent, because some reducing agents may change the color of clothes.

The oxidizing agent may include, for example, hydrogen peroxide, peroxides such as benzoyl peroxide, percarboxylic acids such as peracetic acid and performic acid, and/or percarbonates such as sodium peroxocarbonate.

The reducing agent may include, for example, sulfites such as sodium sulfite, borohydride compounds such as sodium borohydride, dithionous acid salts such as hydrosulfite, and/or thiourea dioxide.

The concentration of the oxidizing agent or the reducing agent may preferably be 3 to 30% owf, more preferably 3 to 20% owf, still more preferably 5 to 10% owf. When the concentration is less than 3% owf, stain removability may be reduced. When the concentration is more than 30% owf, the increased amount of oxidizing agent or a reducing agent may be unnecessary, and thus, the additional oxidizing agent or a reducing agent may be wasted.

The chemical liquid 14 may include various kinds of additives, as long as they do not prevent the effects of the bleaching apparatus or the bleaching method of the present disclosure. For example, the additives may include mold removal agents, rust removal agents, chelating agents, alkaline agents, pH adjusters, peroxide reaction accelerators, and/or peroxide reaction inhibitors.

It does not matter which kinds of clothes 2 are immersed in the chemical liquid 14. For example, the chemical liquid 14 can be used for clothes made of synthetic fibers such as polyester or nylon, cellulose fibers such as cotton, hemp, or rayon, and/or animal fibers such as wool or silk.

It is noted that a net-like member 15 may be attached to the immersing vessel 11 at a position below the liquid surface of the chemical liquid 14, so that the netlike member 15 is parallel to the liquid surface. In some cases, the clothes 2 may be pushed up to the liquid surface by air bubbles generated in the chemical liquid 14. In such cases, the netlike member 15 can be used to keep the clothes 2 under the liquid surface of the chemical liquid 14. Thus, the bleaching effect due to the chemical liquid 14 may be improved.

Additionally, the immersing vessel 11 may have mirror surfaces on the inside surfaces thereof. By reflecting light inside the immersing vessel 11, a part of clothes where light does not directly reach may be processed by the reflected light.

It is noted that the bleaching apparatus of the present disclosure is not limited to the above-described embodiments. Various kinds of changes may be possible in the scope of the disclosure without departing from the spirit of the disclosure. For example, a shielding member, through which only light can be transmitted, may be used. The shielding member may be provided between the light source 13 and the chemical liquid 14 to prevent the light source 13 from being heated or short circuited by vapor generated from the heated chemical liquid 14. The shielding member may be made of any materials through which light can be transmitted, such as an acrylic board or a glass plate.

In some cases, bubbles are generated due to peroxide or an interfacial active agent contained in the chemical liquid 14. Such bubbles may push the clothes up to the liquid surface of the chemical liquid 14. To prevent the clothes 2 from floating, an inner lid may be provided. The inner lid allows the clothes 2 to be pushed into the chemical liquid 14, such that the clothes 2 can be sufficiently bleached. For example, the inner lid may be net-like. The net-like inner lid may be provided so as to cover the liquid surface of the chemical liquid 14. Additionally, the inner lid may have a plurality of projection portions. The plurality of projection portions may be used to sufficiently push the clothes 2 into the chemical liquid 14.

[A Method for Bleaching Clothes]

A method for bleaching clothes may include an immersing step of immersing clothes in a chemical liquid and an irradiating step of irradiating the clothes with light from a light source. The immersing step and the irradiating step may be separately performed. Preferably, the both steps are performed at the same time. Because the chemical liquid can be activated during the irradiating step, the washing effect of the clothes may be improved during the immersing step.

The clothes may be any kind of clothes that can be subjected to bleaching. Such clothes may be made of, for example, synthetic fibers such as polyester or nylon, cellulose fibers such as cotton, hemp, or rayon, and/or animal fibers such as wool or silk.

[Immersing Step]

In the immersing step, clothes are immersed in the chemical liquid. By doing so, a stain attached to the clothes may be degraded in the chemical liquid, and the stain may be removed from the clothes. The composition of the chemical liquid is not particularly limited, and thus the chemical liquid may include, for example, a conventional bleaching agent. As the bleaching agent used for the chemical liquid, an oxidizing agent is more preferable than a reducing agent, because some reducing agents may change the colors of the clothes.

The oxidizing agent may include, for example, peroxides such as hydrogen peroxide or benzoyl peroxide, percarboxylic acids such as peracetic acid or performic acid, and/or percarbonates such as sodium peroxocarbonate. The reducing agent may include, for example, sulfites such as sodium sulfite, borohydride compounds such as sodium borohydride, dithionous acid salts such as hydrosulfite, and/or thiourea dioxide.

The concentration of the above-mentioned oxidizing agent or the reducing agent may preferably be 3 to 30% owf, more preferably 3 to 20% owf, still more preferably 5 to 10% owf. When the concentration of the oxidizing agent or the reducing agent is less than 3% owf, its washing effect may be reduced. When the concentration of the oxidizing agent or the reducing agent is more than 30% owf, part of the agent, the part which does not contribute to washing, may be wasted.

In the immersing step, the immersing temperature is not particularly limited. The immersing temperature may preferably be 10 to 80° C., more preferably 40 to 70° C., still more preferably 50 to 60° C. When the immersing temperature is less than 10° C., the washing effect may be not enough. When the immersing temperature is more than 80° C., the level of the stains removability may stay unchanged and thus, energy efficiency may be reduced.

In the immersing step, the chemical liquid may preferably be agitated so that the chemical liquid may seep evenly into the clothes. The agitating rate may be preferably 5 to 40 r/min, more preferably 10 to 30 r/min, still more preferably 15 to 20 r/min. When the agitating rate is less than 5 r/min, the agitation may be not enough and thus the clothes may not be washed evenly. When the agitating rate is more than 40 r/min, such agitating rate is unnecessary and thus, a part of the energy used for agitating may be wasted.

In the immersing step, the time required for the immersing step is not particularly limited. However, the immersing time may be, for example, about 20 to 40 min, so as to sufficiently wash clothes.

[Irradiating Step]

In the irradiating step, clothes may be irradiated with light. The irradiation intensity of the light may preferably be 10,000 to 70,000 lm. When the irradiation intensity is less than 10,000 lm, sebum stains, which may lead to yellowing of clothes, may not be sufficiently washed. On the other hand, when the irradiation intensity is more than 70,000 lm, the level of stain removability may stay unchanged and thus, the energy efficiency may be reduced.

The illumination intensity of the light may be preferably 1,000 to 10,000 lx, more preferably 1,800 to 9,500 lx. When the illumination intensity is less than 1,000 lx, the sebum stain may not be sufficiently washed. On the other hand, when the illumination intensity is more than 10,000 lx, the level of stain removability may stay unchanged and thus, the energy efficiency may be reduced.

In the irradiating step, the wavelength of the light may be preferably 400 to 650 nm, more preferably 400 to 550 nm, still more preferably 420 to 450 nm. When the wavelength is less than 400 nm or more than 650 nm, clothes may not be sufficiently washed.

In the irradiating step, the kind of light source is not particularly limited. However, the light source may preferably be LEDs having a strong peak at a certain wavelength. There may only be only one LED. However, a plurality of LEDs may be provided so that the object may be irradiated throughout.

In the irradiating step, the irradiating time is not particularly limited. However, the irradiating time may be, for example, about 20 to 40 min, so as to sufficiently wash the object.

Experimental Example 1-1

The present disclosure will be described further specifically using the following experimental examples. However, the experimental examples are not intended to limit the scope of the present disclosure. An experimental example 1 was performed using the bleaching apparatus 1 illustrated in FIG. 1. The immersing vessel 11 was filled with the chemical liquid 14. The chemical liquid 14 included 20 g/l of hydrogen peroxide as an oxidizing agent (UBE-MC Hydrogen Peroxide Limited), 0.5 g/l of BK90 nm (poly (oxyethylene) alkyl ether (C12-15), NICCA CHEMICAL CO., LTD.) as a detergent, and 1 g/l of CHELEST P (Diethylenetriaminepentaaceticacid pentasodium,) as a chelating agent as an additive agent. The above-mentioned chemical liquid 14 was warmed to 40° C. Then, the clothes 2 were immersed in the chemical liquid 14. At this time, the clothes 2 were irradiated with white daylight from the light source 13 (fluorescent light) for 60 min. In this way, the clothes 2 were bleached. It is noted that fragments of yellowed shirt made of 100% cotton were used as the clothes 2 in this example.

Experimental Examples 1-2 to 1-10

In experimental examples 1-2 to 1-10, the detergent, immersing time in the chemical liquid, and an irradiation intensity of the light were those shown in Table 1. These parameters were used for bleaching.

TABLE 1

| | | | Experimental example1-1 | Experimental example1-2 | Experimental example1-3 | Experimental example1-4 | Experimental example1-5 |
|---|---|---|---|---|---|---|---|
| Immersing step | Composition of chemical liquid | Oxidizing agent | Hydrogen peroxide | Hydrogen peroxide | Hydrogen peroxide | Hydrogen peroxide | Hydrogen peroxide |
| | | Concentration (g/l) | 5 | 5 | 5 | 5 | 10 |
| | | Detergent | BK90 nm | BK90 nm | BK90 nm | BK90 nm | BK90 nm |
| | | Concentration (g/l) | 0.5 | 0.5 | 0.5 | 0.5 | 0.5 |
| | | Chelating agent | CHELEST P | CHELEST P | CHELEST P | CHELEST P | CHELEST P |
| | | Concentration (g/l) | 1 | 1 | 1 | 1 | 1 |
| | | Alkaline agent | Soda ash | Soda ash | Soda ash | Soda ash | Soda ash |
| | | Concentration (g/l) | 3 | 3 | 3 | 3 | 3 |
| | Immersing time (min) | | 30 | 30 | 30 | 30 | 30 |
| | Immersing temperature(° C.) | | 40 | 40 | 40 | 40 | 15 |
| Irradiation step | Illumination intensity(lx) | | 1053 | 1936 | 3559 | 846 | 9214 |
| | Irradiation intensity(lm) | | Fluorescent light (white daylight) | 14404.8 | 26480.7 | 6294.6 | 68556.5 |
| | Irradiation wavelength λ p(nm) | | 545 | 632 | 517 | 455 | 455 |
| | | | Experimental example1-6 | Experimental example1-7 | Experimental example1-8 | Experimental example1-9 | Experimental example1-10 |
| Immersing step | Composition of chemical liquid | Oxidizing agent | Hydrogen peroxide | Hydrogen peroxide | Hydrogen peroxide | Hydrogen peroxide | Hydrogen peroxide |
| | | Concentration (g/l) | 10 | 10 | 10 | 10 | 10 |
| | | Detergent | BK90 nm | BK90 nm | BK90 nm | BK90 nm | BK90 nm |
| | | Concentration (g/l) | 0.5 | 0.5 | 0.5 | 0.5 | 0.5 |
| | | Chelating agent | CHELEST P | CHELEST P | CHELEST P | CHELEST P | CHELEST P |
| | | Concentration (g/l) | 1 | 1 | 1 | 1 | 1 |
| | | Alkaline agent | Soda ash | Soda ash | Soda ash | Soda ash | Soda ash |
| | | Concentration (g/l) | 3 | 3 | 3 | 3 | 3 |

TABLE 1-continued

| | | | | | | |
|---|---|---|---|---|---|---|
| | Immersing time (min) | 40 | 40 | 40 | 40 | 40 |
| | Immersing temperature(° C.) | 60 | 60 | 60 | 15 | 15 |
| Irradiation step | Illumination intensity(lx) | 9214 | 1936 | 3559 | 1936 | 3559 |
| | Irradiation intensity(lm) | 68556.5 | 14404.8 | 26480.7 | 14404.8 | 26480.7 |
| | Irradiation wavelength λ p(nm) | 455 | 632 | 517 | 632 | 517 |

Experimental Examples 2-1 to 2-2

In experimental examples 2-1 and 2-2, bleaching was performed following the parameters shown in Table 2. Specifically, the composition of the chemical liquid, immersing time, immersing temperature, illumination intensity, irradiation intensity, and irradiation wavelength were adjusted according to Table 2. In this experimental examples, a patterned shirt was used as the subject to be bleached, instead of the yellowed shirt.

TABLE 2

| | | | Experimental example2-1 | Experimental example2-2 |
|---|---|---|---|---|
| Immersing step | Composition of chemical liquid | Oxidizing agent | Hydrogen peroxide | Hydrogen peroxide |
| | | Concentration (g/l) | 10 | 10 |
| | | Detergent | BK90 nm | BK90 nm |
| | | Concentration (g/l) | 0.5 | 0.5 |
| | | Chelating agent | CHELEST P | CHELEST P |
| | | Concentration (g/l) | 1 | 1 |
| | | Alkaline agent | Soda ash | Soda ash |
| | | Concentration (g/l) | 3 | 3 |
| | Immersing time (min) | | 40 | 30 |
| | Immersing temperature (° C.) | | 60 | 50 |
| Irradiating step | Illumination intensity (lx) | | 9214 | 6339 |
| | Irradiation intensity (lm) | | 68556.5 | 47165.2 |
| | Irradiation wavelength λ p (nm) | | 455 | 455 |

[Method of Evaluation]

The shirt was photographed before and after washing treatment by a digital camera (resolution: 300 dpi; number of pixels: 1000×1000 pixels). The same portion of the shirt was photographed before and after the treatment. L*, a* and b* (Japanese Industrial Standard; JIS Z 8781-4) were determined per pixel. The frequency of pixels showing certain L* values, a* values, and b* values per 1000 pixels (hereinafter, called as "pixel frequency") was shown graphically for evaluation. The pixel frequencies of experimental examples 1-1 to 1-10 are respectively shown graphically in FIGS. 2 to 11. Additionally, the L* values, a* values, and b* values of the experimental examples 1-1 to 1-10 are shown in the following Table 3. In the experimental examples 2-1 and 2-2, pixel frequencies were hard to determine, because a patterned shirt was used as the subject to be bleached. Therefore, regarding the experimental examples 2-1 and 2-2, whether the stain of the shirt was removed was visually confirmed. As a result, it was judged that the stain of the shirt was removed.

TABLE 3

| | | L | a* | b* |
|---|---|---|---|---|
| Experimental example1-1 | Before treatment | 79.2 | 0 | 4.9 |
| | After treatment | 83.1 | −0.3 | 4.7 |
| Experimental example1-2 | Before treatment | 76.7 | −0.7 | 6.8 |
| | After treatment | 81.4 | −0.4 | 5.9 |
| Experimental example1-3 | Before treatment | 75.1 | −0.3 | 5.3 |
| | After treatment | 82.7 | 0.6 | 4.7 |
| Experimental example1-4 | Before treatment | 77.5 | 0 | 3.4 |
| | After treatment | 86.8 | −0.6 | 2.5 |
| Experimental example1-5 | Before treatment | 7.3 | 0.8 | 2.6 |
| | After treatment | 88.3 | −0.2 | −2.7 |
| Experimental example1-6 | Before treatment | 77.2 | 1.9 | 4.5 |
| | After treatment | 89.2 | −2.9 | −0.8 |
| Experimental example1-7 | Before treatment | 76.3 | 2.8 | 3.6 |
| | After treatment | 85.1 | −2.6 | 0.5 |
| Experimental example1-8 | Before treatment | 77.2 | 0.3 | 2.3 |
| | After treatment | 81.9 | −0.3 | −1.3 |
| Experimental example1-9 | Before treatment | 75.8 | 2.6 | 4.4 |
| | After treatment | 81.2 | −0.5 | 1.3 |
| Experimental example1-10 | Before treatment | 77.3 | 1.8 | 3.5 |
| | After treatment | 81.4 | −2 | 1.6 |
| Experiment N | Before treatment | 76.7 | 3.2 | 5 |
| | After treatment | 86.4 | −1.4 | −1.2 |
| Experiment K | Before treatment | 74.5 | 0.1 | 5 |
| | After treatment | 87.1 | −0.3 | −1.1 |

The invention claimed is:

1. A bleaching apparatus for clothes, comprising:
- an immersing vessel for immersing clothes in a chemical liquid;
- a light source for irradiating the clothes immersed in the immersing vessel with light;
- a net-like member provided parallel to a liquid surface of the chemical liquid to keep the clothes under the liquid surface of the chemical liquid; and
- a mirror surface provided in the immersing vessel so that the light may reach an entirety of the clothes.

2. The bleaching apparatus according to claim 1, wherein the clothes include at least one fiber selected from the group consisting of synthetic fiber, cellulose fiber and animal fiber.

3. The bleaching apparatus according to claim 1, wherein the chemical liquid includes an oxidizing agent or a reducing agent in a concentration of 3 to 30% owf.

4. The bleaching apparatus according to claim 1, wherein the light has an irradiation intensity of 10,000 to 70,000 lm.

5. The bleaching apparatus according to 1, wherein the light has an illumination intensity of 1,000 to 10,000 lx.

6. The bleaching apparatus according to claim 1, wherein the light has an irradiation wavelength of 400 to 650 nm.

7. The bleaching apparatus according to claim 1, wherein the light source is placed at a position located 5 to 50 cm away from an upper surface of the chemical liquid.

8. A method of bleaching clothes, comprising:
- storing a chemical liquid in an immersing vessel where a mirror surface is provided on an inside surface thereof,
- immersing clothes in a chemical liquid, and
- irradiating the clothes with light from a light source,
- wherein the clothes are kept in the chemical liquid by a net-like member provided parallel to a liquid surface of the chemical liquid while irradiating the clothes.

9. The bleaching method according to claim 8, wherein the clothes include at least one fiber selected from the group consisting of synthetic fiber, cellulose fiber and animal fiber.

10. The bleaching method according to claim 8, wherein the chemical liquid includes an oxidizing agent or a reducing agent in a concentration of 3 to 30% owf.

11. The bleaching method according to claim 8, wherein an immersing temperature in the immersing step is 10 to 80° C.

12. The bleaching method according to claim 8, wherein an agitation rate in the immersing step is 5 to 40 r/min.

13. The bleaching method according to claim 8, wherein the light in the irradiating step has an irradiation intensity of 2,000 to 5,500 lm.

14. The bleaching method according to claim 8, wherein the light has an illumination intensity of 1,000 to 10,000 lx.

15. The bleaching method according to claim 8, wherein the light in the irradiating step has an irradiation wavelength of 400 to 650 nm.

16. The bleaching method according to claim 8, wherein the immersing step and the irradiating step are performed at the same time.

17. A bleaching apparatus for clothes, comprising:

an immersing vessel for immersing clothes in a chemical liquid, the chemical liquid including an oxidizing agent in a concentration of 3 to 30% owf;

a light source for irradiating the clothes immersed in the immersing vessel with light;

a mirror surface provided in the immersing vessel so that the light may reach the entirety of the clothes; and a net-like member provided parallel to a liquid surface of the chemical liquid to keep the clothes under the liquid surface of the chemical liquid.

18. The bleaching apparatus according to claim 17, wherein the light source has an LED attached so as to irradiate a liquid surface of the chemical liquid.

* * * * *